Oct. 26, 1965　　R. L. VAN WINKLE ETAL　　3,214,229
SEGMENTED HOUSING CONSTRUCTION
Filed Oct. 8, 1964　　2 Sheets-Sheet 1
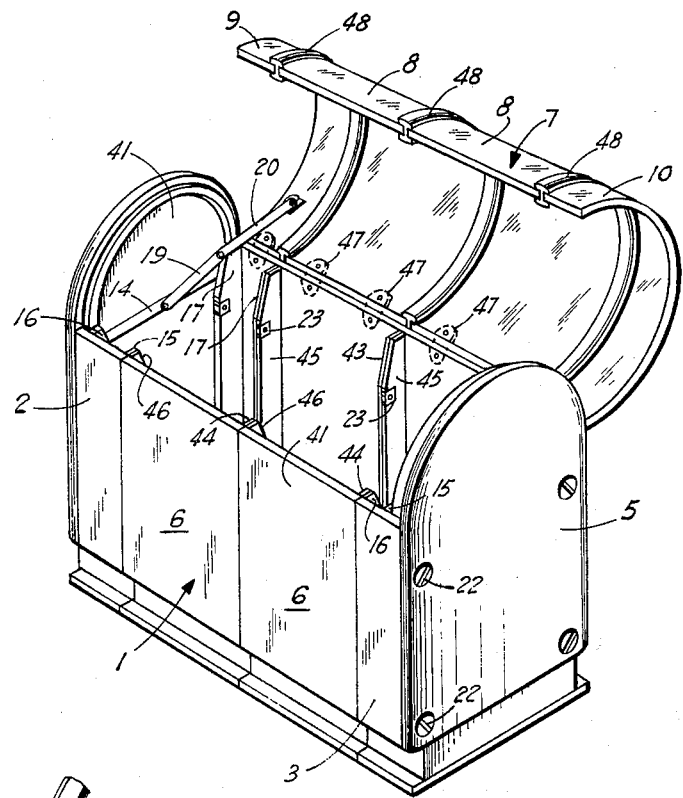
Fig. 1
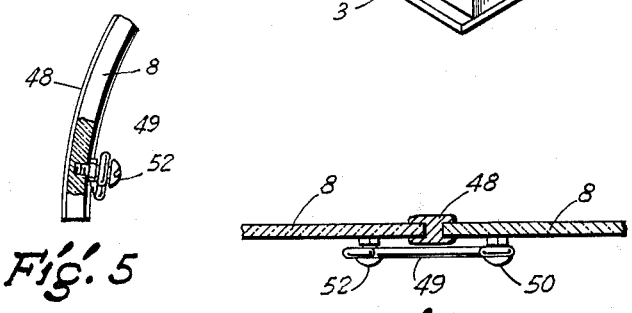
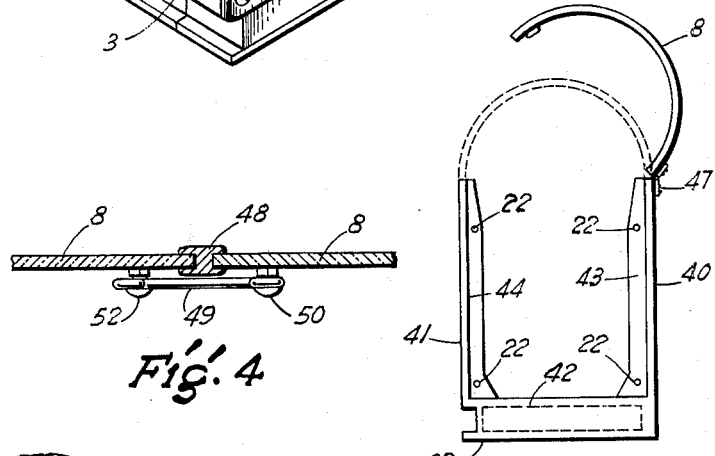
Fig. 5
Fig. 4
Fig. 2
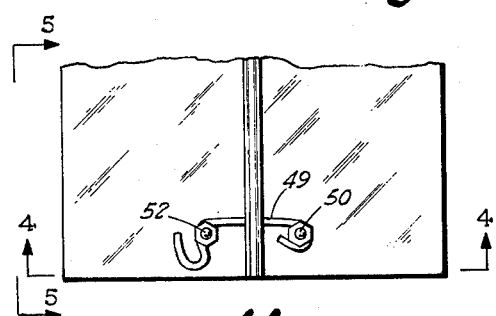
Fig. 3
INVENTORS
Roy L. Van Winkle
William L. Lankford Jr.
Carl S. Ward
BY Mildred K. Flowers
AGENT Oct. 26, 1965    R. L. VAN WINKLE ETAL    3,214,229
SEGMENTED HOUSING CONSTRUCTION
Filed Oct. 8, 1964    2 Sheets-Sheet 2

INVENTORS
Roy L. Van Winkle
William L. Lankford Jr.
Carl S. Ward
BY Mildred K. Flowers
AGENT

United States Patent Office 3,214,229
Patented Oct. 26, 1965

3,214,229
SEGMENTED HOUSING CONSTRUCTION
Roy L. Van Winkle, Edmond, and William L. Lankford, Jr., and Carl S. Ward, Oklahoma City, Okla., assignors to The Geograph Company, Oklahoma City, Okla., a corporation of Oklahoma
Filed Oct. 8, 1964, Ser. No. 402,597
1 Claim. (Cl. 312—205)

This application is a continuation-in-part of our co-pending application Serial No. 247,140, filed December 26, 1962, entitled "Recorder Construction," now Patent No. 3,182,332.

The present invention relates to a segmented housing structure and more particularly, but not by way of limitation, to a housing construction assembled from substantially identical end units having one or more modules, all of which are substantially identical in structure, interposed therebetween. By virtue of the modular construction, it is possible to assemble housings or casings of variable sizes for utilization with variable requirements of a given situation.

There are many installations wherein it is desirable to provide substantially identical housing structures, but with the housings being of variable sizes, particularly of variable overall lengths. For example, purely by way of illustration and not by way of limitation, many recording devices such as utilized for recording information relative to the drilling of oil wells require substantially identical housings, but the overall length of the housings required may vary depending upon the number of variables being recorded and the number of recording devices required therefor. Such a recorder construction is disclosed in our above mentioned co-pending application Serial No. 247,-140.

The prior art does not provide a housing which can meet the above indicated variations and differing demands for meeting the requirements of a variety of installations. However, as will be hereinafter set forth the present invention, by reason of its modular construction, provides a housing construction which can satisfy the demands of substantially any suitable installation within reasonable limitations.

The present invention includes two similar and complementary end units between which one, two or more housing segments or modules may be mounted in assembled relation. Each module is substantially identical and may be readily secured together for providing a housing of substantially any desired overall length. In addition, a cover of a corresponding segmental construction is also provided for the housing. A cover section may be provided for or hingedly secured to each housing module and each cover section may be readily secured to the cover segment carried by the adjacent housing module to provide a segmented lid or cover for the entire assembled housing. Of course, the cover segments may be connected together in assembled relation prior to securing thereof to the assembled housing modules, if desired.

It is a principal object of the present invention to provide a housing or casing of modular construction wherein an assembled housing may be provided of substantially any desired overall length to fulfill the requirements of variable installations.

Another object of this invention is to provide a segmented lid or cover structure for a housing and which may be readily connected together in assembled relation to provide a lid for the assembled housing structure.

Other and further objects and advantageous features of the present invention will hereinafter more fully appear in connection with a detailed description of the drawings in which:

FIGURE 1 is a perspective view of a segmented housing construction embodying the invention.

FIGURE 2 is an end view of a housing module or segment embodying the invention with a cover segment secured thereto and depict in an open position in solid lines and in a closed position in dotted lines.

FIGURE 3 is a broken plan view of a pair of adjacent lid or cover segments depicting the securing means therebetween.

FIGURE 4 is a sectional elevational view taken on line 4—4 of FIGURE 3.

FIGURE 5 is a view taken on line 5—5 of FIGURE 3 with portions thereof depicted in section for purposes of illustration.

Figure 6:
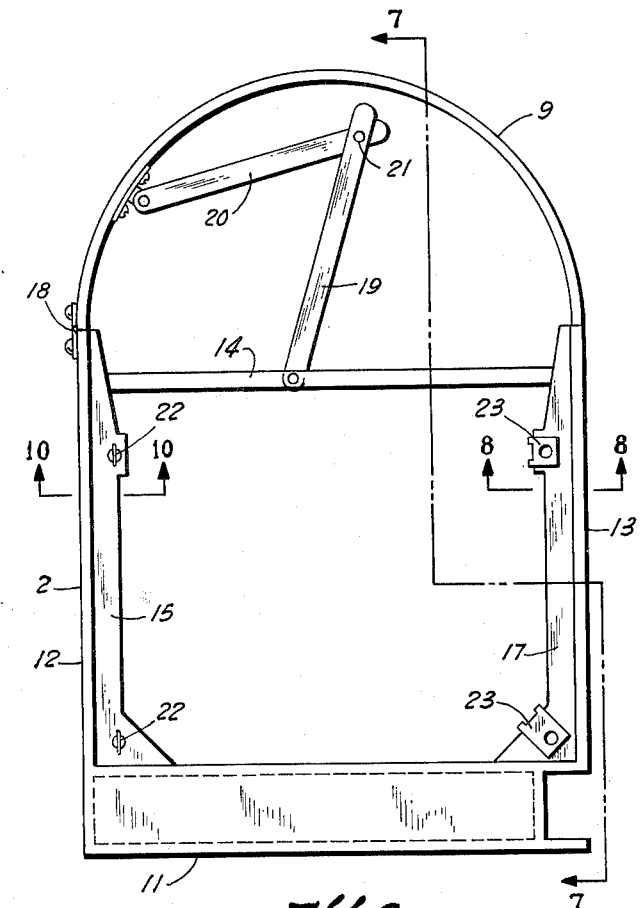
FIGURE 6 is a side elevational view of an end component of the housing construction depicted in FIGURE 1.

Referring to the drawings in detail, reference character 1 generally indicates a housing or casing assembly comprising a left hand end unit 2 and a right hand end unit 3, which will be hereinafter set forth in detail. Cover or end closure members 4 and 5 are secured to the end units 2 and 3, respectively, in any suitable manner, such as by suitable fasteners to be hereinafter described. A plurality of modules 6 are interposed between the end units 2 and 3 and are connected together in assembled relation and to the end units as will be hereinafter set forth. The modules 6 are of substantially identical construction and one or more thereof may be interposed between the end units 2 and 3 as desired and in accordance with the requirements of the particular installation for the housing 1. A sectional or segmental cover generally indicated by reference character 7 is provided for the housing 1 and comprises a plurality of intermediate segments 8 constructed of a suitable transparent plastic material and oppositely disposed end segments 9 and 10 constructed from the same material. The segments 8 and end segments 9 and 10 are connected together in a manner as will be hereinafter set forth in detail to provide the completed or assembled cover 7 for the housing 1.

Figure 7:
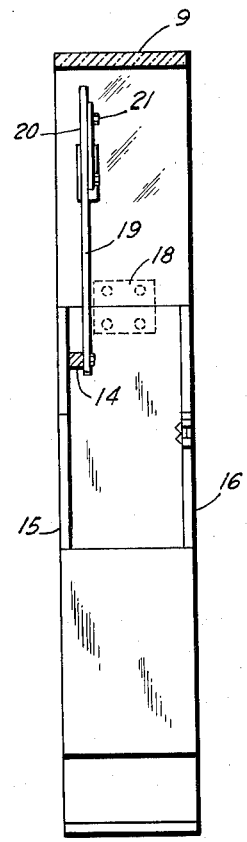
FIGURE 7 is a sectional view taken on line 7—7 of FIGURE 6.

The end units 2 and 3 are of a substantially identical construction and only one will be set forth in detail. Referring to FIGURES 6 and 7 the end section 2 is defined by a flat base plate 11 and front and rear flat upright members 12 and 13, respectively. A suitable cross bar or bracket 14 extends between the two uprights 12 and 13 adjacent the upper ends thereof. Similar inwardly directed web members 17 (only one of which is shown in FIGURE 6) are provided adjacent the side edges of the upright member 13 and preferably in substantially planar alignment with the respective web members 15 and 16. The cover section 9 is secured to the end unit 2 by means of a suitable hinge, such as indicated at 18. The cover section or segment 9 is supported by the unit 2 in any well known manner, such as by a pair of arms 19 and 20 pivotally connected to each other at 21 and at their other ends to the lid segment 9 and end unit 2 for facilitating opening and closing of the cover. It will be apparent that the support arms 19 and 20 may be provided in only one of the end units or in both end units, as desired. For example, in a housing of relatively short overall length, it may be necessary to provide the support arms 19 and 20 in only one end unit, whereas in a housing of relatively long overall length, it may be desirable to provide the support arms 19 and 20 for each end section 2 and 3.

Complementary fasteners 22 and clip members 23 cooperate with the webs 15, 16 and 17 for facilitating the assembly of the housing 1. Whereas FIGURE 6 depicts the snap-on fasteners 22 in connection with the web 15 and the clips 23 in connection with the webs 17, it will be readily apparent that the snaps and fasteners may be utilized in combination with any desired webs in the assembly of the housing 1.

Figure 10:
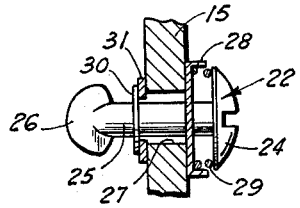
FIGURE 10 is a sectional view, on an enlarged scale, taken on line 10—10 of FIGURE 6 showing the details of a snap-on screw.

The snap-on fastener 22 may be of any suitable type as hereinbefore set forth and in essence, these fasteners are the same as the quarter-turn fasteners used in the aircraft industry. As particularly shown in FIGURE 10, the fastener 22 includes a head portion 24, a shank portion 25 and a tongue 26 at the opposite end of the shank 25 from the head 24. The shank 25 passes through a suitable hole 27 provided in the web 15. A spring retainer 28 and spring 29 are mounted on the shank 25 adjacent the head 42 so as to urge the fastener 22 in a right hand direction as viewed in FIGURE 10. Washers 30 and 31 serve to limit movement of the fastener 41 in the right hand direction.

Figure 8:
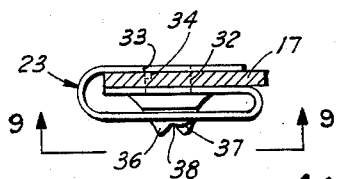
FIGURE 8 is a sectional view, on an enlarged scale, taken on line 8—8 of FIGURE 6, showing the details of a clip.
Figure 9:
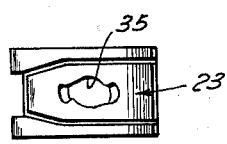
FIGURE 9 is an elevation of the elevational view of the clip per se as it would appear taken along line 9—9 of FIGURE 8 or in other words, showing the opposite side of the clip from that shown in FIGURE 6.

Referring now to FIGURES 8 and 9, these show the details of the clips 23 which is more or less conventional in character and which can be used in conjunction with the fasteners 22 to provide connection between the modules 6 and the end units 2 and 3 and the cover plates 4 and 5 as will be hereinafter set forth in detail. Whereas the clip 23 disclosed herein may be preferable, it should be understood that any other conventional clip which is adapted to perform the same function would be suitable for the purposes of the present invention. The clip 23 is a piece of resilient sheet metal bent in the form shown in FIGURE 8. The webs 17 may be provided with a plurality of holes 32 through which the tongue 26 and shank 25 of one of the fasteners 22 will pass to engage the respective clips 23 as will be hereinafter described. The clip itself is provided with a hole 33 which is complementary to and in alignment with the associated hole 32. A small retaining lip 34 will engage the complementary hole 32 and prevent the clip from sliding off the web 17. On the opposite side of the clip 23 from the hole 33 is a slot 35 shaped as shown in FIGURE 9. When the tongue 26 of the fastener 22 is in alignment with the slot 35, this tongue can pass through; thereafter, a nine degree rotation of the fastener 22 will place the latter in locking engagement with the clip 23. The projections 36 and 37 on the opposite side of the clip 23 from the hole 35 form between them recesses 38 in which the sides of the tongue are received to hold the fastener in the locked position as indicated above.

The mechanical details of each module 6 are shown in FIGURES 1 and 2. Each module 6 includes a base member 39, a rear upright 40 and a front upright 4. A horizontal partition 42 forms a part of the frame structure above the base 39. The upright 40 is provided with an inwardly directed web 43 in which are mounted a plurality of the fasteners 22. Similarly, the upright 41 is provided with an inwardly directed web 44 which also includes a plurality of the fasteners 22. The uprights 40 and 41 are provided with similarly shaped webs 45 and 46 oppositely disposed from the webs 43 and 44 and include clips 23 in positions corresponding to the fasteners 22 carried by the webs 43 and 44. One of the the cover segments 8 may be secured to the rear upright member 40 by any suitable hinge means, such as the hinges 47.

Each of the cover segments 8, 9 and 10 are preferably substantially arcuate or semi-circular in cross-sectional configuration as clearly shown in the drawings and any desired number of the segments 8 may be interposed between the segments 9 and 10 in accordance with the number of modules 6 interposed between the end units 2 and 3. Adjacent pairs of segments 8 are secured together in end to end relationship by means of rubber or plastic strips 48 having a generally H-shaped cross-sectional configuration whereby the strip 48 engages or grips the side edges of adjacent lid segments 8. A suitable hook member 49 is pivotally carried by a stud member 50 provided on the inner periphery of one segment 8 in the proximity of the H-shaped strip 48 and engages a similar stud 52 provided on the inner periphery of the adjacent segment 8. The hook 49 cooperates between the stud members 50 and 52 for facilitating retaining of two adjacent segments 8 securely within the gripping engagement of the H-shaped strip 48. The end segments 9 and 10 may be similarly secured to the segments 8 to provide a completely assembled lid 7 for the housing 1.

Assuming now it is desired to construct the housing structure 1 as shown in FIGURE 1 from a plurality of modules 6 and the end units 2 and 3 and lid segments 8, 9 and 10, the following steps may be taken: The left hand module 6 shown in FIGURE 1 is placed in abutting relationship with the end unit 2. The fasteners 22 and clips 23 on the abutting webs of the end unit 2 and module 6 are fitted together as hereinbefore set forth by turning the fasteners 22 through a one-quarter turn each, the left hand module 6 is attached to the end unit 2. The next module 6, which is the only remaining module depicted in FIGURE 1, is placed in abutting relation with the first module 6 referred to above and the fasteners 22 at the right hand edge or web of the first module are placed in engagement with the corresponding clips 23 on the left hand edge or web of the second module. Turning of the fasteners 22 of the first module will cause engagement between the first and second modules. Whereas FIGURE 1 depicts only two of the modules 6, it will be apparent that substantially any number of the modules may be secured together in this manner to provide a housing 1 of the desired overall length.

Subsequent to the connection of the desired number of modules 6, it may be desirable to mount or otherwise dispose any recording equipment, or the like, with with which the housing 1 is to be utilized within the assembled structure prior to securing of the end unit 3 on the right hand module 6. The end unit 3 may now be placed against the right hand module 6 in such a manner that the fasteners 22 and corresponding clips 23 of the right hand module 6 and the left hand edge of the end unit 3 may be engaged. Turning of the fasteners 22 will lock the end unit 3 against the adjacent module 6.

As far as the cover or lid 7 is concerned, the same can be assembled and attached at this juncture or the individual segments may be assembled contemporaneously with the addition of each module. The left hand lid segment 8 may be secured to the end segment 9 by the strip 48. The adjacent edges of the segments 8 and 9 may be inserted into the H-shape configuration of the strip 48 and the hook member 49 may be engaged with the respective stud 52 for facilitating retaining of the segments 8 and 9 in aligned disposition. The next succeeding lid segment 8 may be similarly secured to the first segment 8 and the procedure may be repeated for each segment 8 required for the housing 1. The right hand end segment 10 may be similarly secured to the right hand segment 8, thus providing a lid 7 for the cover 10. Of course, the end covers 4 and 5, each of which have mounted therein four fasteners 22, may be secured to the respective end units 2 and 3 by the fasteners 22 and corresponding clips 23 in the manner hereinbefore set forth.

As stated heretofore, the modules 6 are interchangable and as many or as few modules can be employed as required consistent with the particular installation with which the housing 1 is to be utilized. In addition, the end units 2 and 3 are of substantially identical construction, thus providing a housing which may be readily assembled to meet substantially any overall length requirements.

Whereas, the present invention has been described in particular relation to the drawings attached hereto, it should be understood that other and further modifications, apart from those shown or suggested herein, may be made within the spirit and scope of this invention.

What is claimed is:

A housing structure comprising a pair of substantially identical end units arranged in spaced and parallel relation, a plurality of modules mounted between the said end units, a sectional lid member in association with the modules and end units, each of said end units comprising a base means, front and rear upright members carried by the base means, a pair of inwardly directed web members carried by each upright member adjacent the opposite edges thereof with corresponding pairs of the web members being disposed in substantial planar alignment, end cover means secured to one pair of aligned web members of each end unit, each of said modules comprising a base means, front and rear upright members carried by the base means, a pair of inwardly directed web members carried by each of said upright means adjacent the oposite edges thereof with corresponding pairs of the web members being disposed in substantial planar alignment, fastening means cooperating between the web members of adjacent modules for connecting the modules together in assembled relation, said fastening means cooperating between the web members of the end units and modules adjacent thereto for securing the end units to the modules, said sectional lid means comprising an arcuate segment hingedly secured to each of said modules and end units, resilient strip members of substantially H-shaped cross-sectional configuration interposed between each adjacent pair of segments for securing thereof in end to end relation, locking means extending between each adjacent pair of segments for facilitating securing thereof in end to end relation, and means interposed between at least one end unit and its respective lid segment for facilitating opening and closing of the lid.

References Cited by the Examiner

UNITED STATES PATENTS

| D. 138,337 | 7/44 | Braloff | 220—4 |
| 1,149,266 | 8/15 | Johnson | 190—21 |
| 1,321,097 | 11/19 | Gonzalez | 312–108 X |
| 2,398,299 | 4/46 | Frandsen | 190–21 |
| 2,501,980 | 3/50 | Wolfe | 220–4 |
| 2,547,799 | 4/51 | Wernig | 189–77 X |
| 2,577,101 | 12/51 | Ball | 312–107 |
| 2,772,758 | 12/56 | Vaessen | 189–77 |
| 3,012,835 | 12/61 | Anderson | 312–205 X |

FOREIGN PATENTS 1,226,197   7/60   France.

CLAUDE A. LE ROY, *Primary Examiner.*
CHANCELLOR E. HARRIS, FRANK B. SHERRY,
*Examiners.*